(12) United States Patent
Yeager

(10) Patent No.: US 11,730,146 B2
(45) Date of Patent: Aug. 22, 2023

(54) MULTI-LEAD DOG LEASH SYSTEM

(71) Applicant: Jeff Yeager, Clearwater, FL (US)

(72) Inventor: Jeff Yeager, Clearwater, FL (US)

( * ) Notice: Subject to any disclaimer, the term of this patent is extended or adjusted under 35 U.S.C. 154(b) by 63 days.

(21) Appl. No.: 17/193,206

(22) Filed: Mar. 5, 2021

(65) Prior Publication Data

US 2021/0282374 A1    Sep. 16, 2021

Related U.S. Application Data

(60) Provisional application No. 62/988,699, filed on Mar. 12, 2020.

(51) Int. Cl.
*A01K 27/00* (2006.01)

(52) U.S. Cl.
CPC .......... *A01K 27/003* (2013.01); *A01K 27/005* (2013.01)

(58) Field of Classification Search
CPC ............................. A01K 27/003; A01K 27/005
See application file for complete search history.

(56) References Cited

U.S. PATENT DOCUMENTS

| | | | | |
|---|---|---|---|---|
| 5,852,988 A | * | 12/1998 | Gish | A01K 27/003 |
| | | | | 119/795 |
| 6,250,256 B1 | * | 6/2001 | Lin | A01K 27/005 |
| | | | | 119/769 |
| 6,273,029 B1 | * | 8/2001 | Gish | A01K 27/001 |
| | | | | 119/795 |
| 7,757,639 B1 | * | 7/2010 | Prendes | A01K 27/003 |
| | | | | 119/772 |
| 8,955,465 B1 | * | 2/2015 | VanDommelen | A01K 27/003 |
| | | | | 119/795 |
| 9,107,391 B1 | * | 8/2015 | McGuire | A01K 27/00 |
| 2019/0270416 A1 | * | 9/2019 | Glickman | B62D 25/085 |
| 2019/0297852 A1 | * | 10/2019 | Mann | A01K 27/003 |

FOREIGN PATENT DOCUMENTS

WO    WO-2019192930 A1 * 10/2019 ........... A01K 27/003

* cited by examiner

*Primary Examiner* — Joshua D Huson
*Assistant Examiner* — Edgar Reyes
(74) *Attorney, Agent, or Firm* — Lewellyn Law, PLLC; Stephen Lewellyn

(57) ABSTRACT

A multi-lead leash system has a housing that is configured to removably capture ends of a plurality of animal leads within the housing with the leads extending outwardly from the housing. The opposite ends of the leads each have coupling to attach the lead to an animal collar. The housing and captured ends are configured such the capture ends are freely movable within the housing to prevent tangling of the respective leads while walking animals attached to the leads, for example. The housing also has a user lead coupling for the removable coupling of a user lead to the housing, the user lead being grasped by a user using the leash system.

15 Claims, 8 Drawing Sheets

MULTI-LEAD DOG LEASH SYSTEM

CROSS-REFERENCE TO RELATED APPLICATIONS

This application claims the benefit of U.S. Provisional Patent Application Ser. No. 62/988,699, filed Mar. 12, 2020, the entirety of which is incorporated herein by reference.

FIELD OF THE INVENTION

Embodiments of the invention relate to multi-lead dog leashes, and more particularly, to a multi-lead dog leash system for walking a plurality of dogs and preventing tangling of leads.

BACKGROUND OF THE INVENTION

The use of dog leashes is known in the prior art. More specifically, dog leashes previously devised and utilized for the purpose of walking one or more dogs are known to consist basically of familiar, expected, and obvious structural configurations, notwithstanding the myriad of designs encompassed by the crowded prior art which have been developed for the fulfillment many objectives and requirements.

While these devices fulfill their respective, particular objectives and requirements, they do not describe a multi-lead dog leash system that allows walking multiple dogs while preventing a tangling of the leads.

Therefore, it can be appreciated that there exists a continuing need for a new and improved multi-lead dog leash system which can be used for walking multiple dogs while preventing a tangling of the leads. In this regard, the present invention substantially fulfills this need.

SUMMARY OF THE INVENTION

In view of the disadvantages inherent in the known types of dog leashes now present in the prior art, the present invention provides an improved multi-lead dog leash system. As such, the general purpose of the present invention, which will be described subsequently in greater detail, is to provide a new and improved multi-lead dog leash system and method which has all the advantages of the prior art and none of the disadvantages.

In general, in one aspect, a multi-lead leash system is provided. The multi-lead leash system has a housing having an interior space and a hole formed through the housing that allow access into the interior space from a position externally from the housing. A plurality of animal leads are provided, each animal lead has opposite first and second ends and a length that extends between the first and second ends. A terminus located at the first end of each animal lead. The hole has a hole opening width, each terminus has a terminus width, and the length of the lead has a lead width, wherein the dimensions of the hole opening width, the terminus width, and the lead width are selected such that no terminus can pass through the hole when at least one terminus is disposed in the interior and against the housing adjacent the hole, and such that a terminus can pass through the hole when each terminus that is disposed within the interior of the housing moved away from the hole a sufficient distance that allows the passing of another terminus through the hole.

In general, in another aspect, a multi-lead leash system is provided. The multi-lead system has a housing having an interior space and a longitudinal slot formed through the housing and terminating at one end at a first aperture extending through the housing. The slot has a transverse width, and the first aperture has a first aperture opening width, the aperture opening width being greater than the transverse width of the slot. A shutter is movably attached to the housing and is movable relative to housing between first and second positions. When the shutter is in the first position, the first aperture is closed and when the shutter is in the second position the first aperture is open. At least two animal leads are provided, each lead has opposite ends, one of which has a terminus. The terminus has a terminus width that is less than the first aperture opening width and greater than the transverse width of the slot such that the terminus may pass through the first aperture when the shutter is in the second position and cannot pass through the slot. The terminus of each animal lead is removably disposed within the interior space of the housing with a length of the respective animal lead extending through the slot. And a user lead coupling is attached to the housing at a side opposite of the slot to allow connection of a user leash to the housing.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
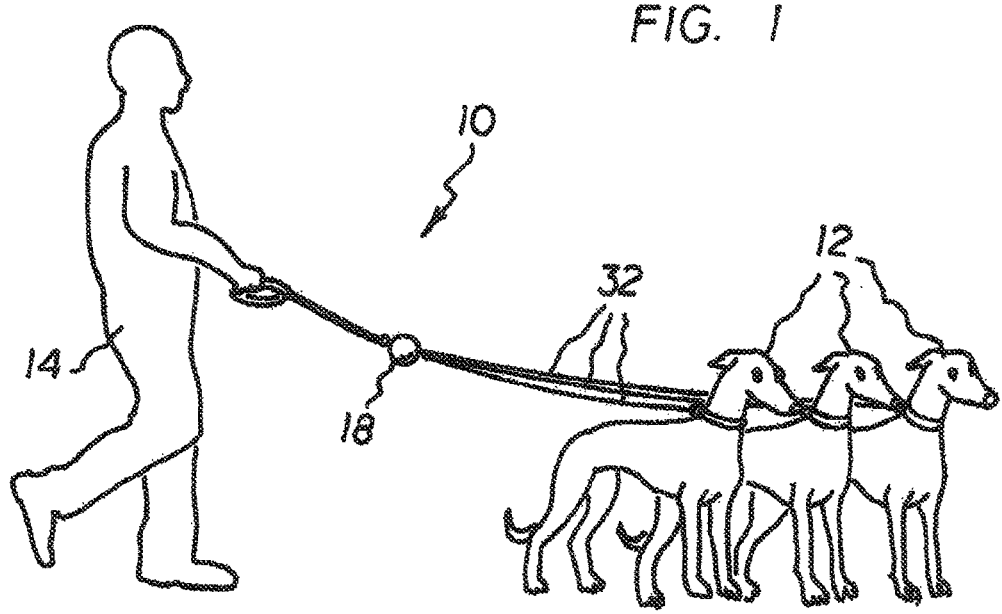
FIG. 1 is a perspective showing of a multi-lead leash system constructed in accordance with the principles of an embodiment of the present invention, the system being shown during an in-use orientation.
Figure 2:
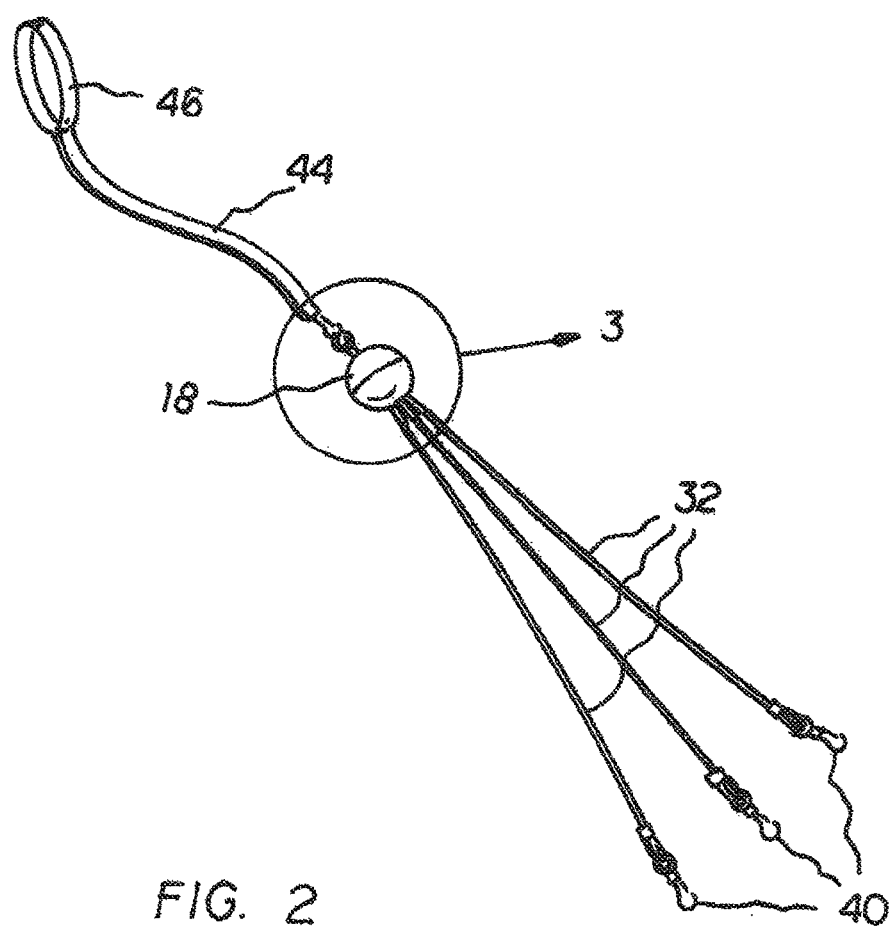
FIG. 2 is a perspective showing of the multi-lead system of FIG. 1, the system being shown in a non-use orientation.
Figure 3:
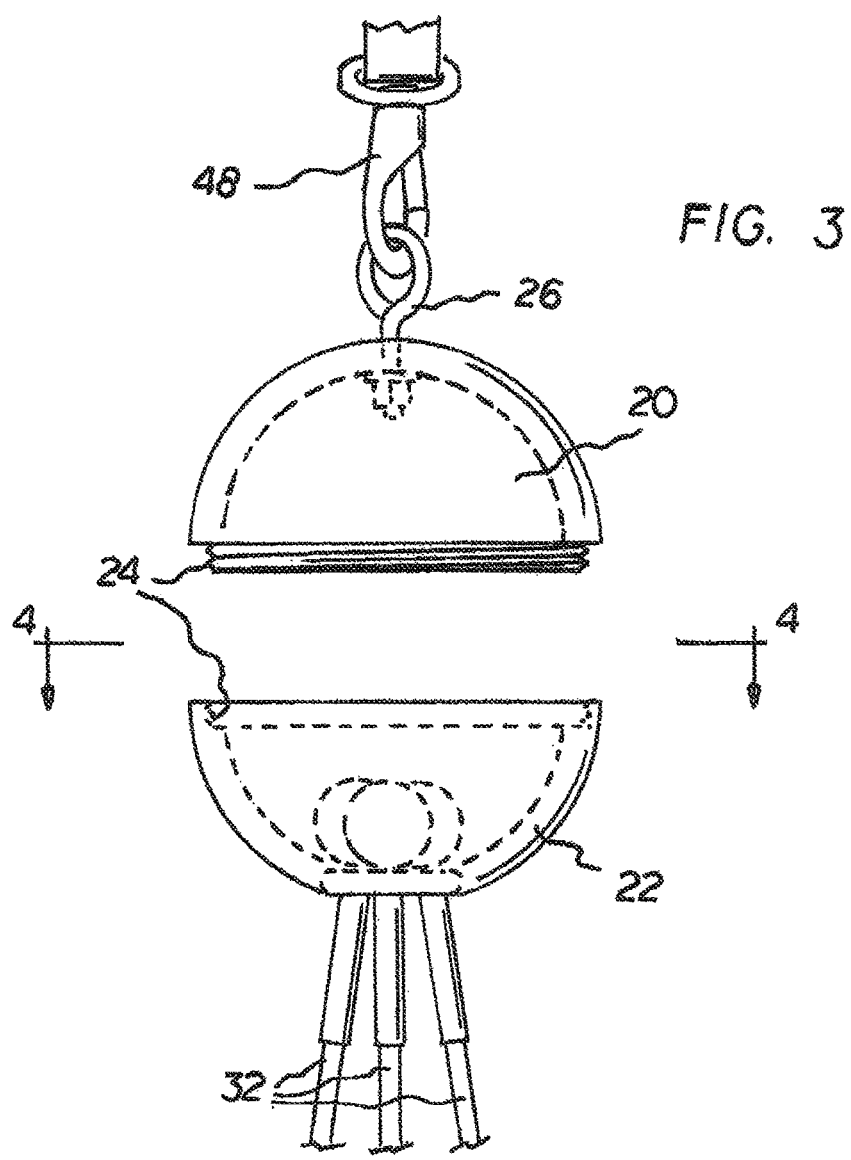
FIG. 3 is an enlarged exploded showing of the constraining apparatus of the prior Figures.
Figure 4:
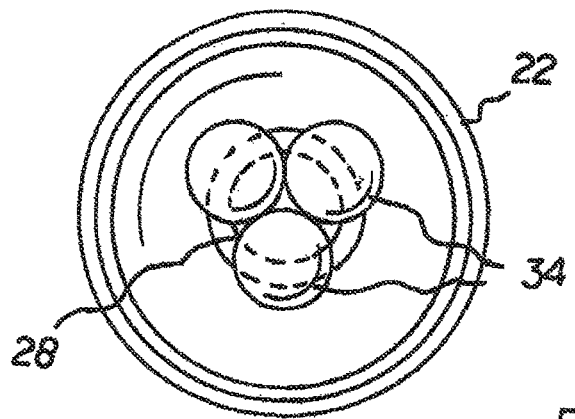
FIG. 4 is a plan view taken at line 4-4 of FIG. 3.
Figure 5:
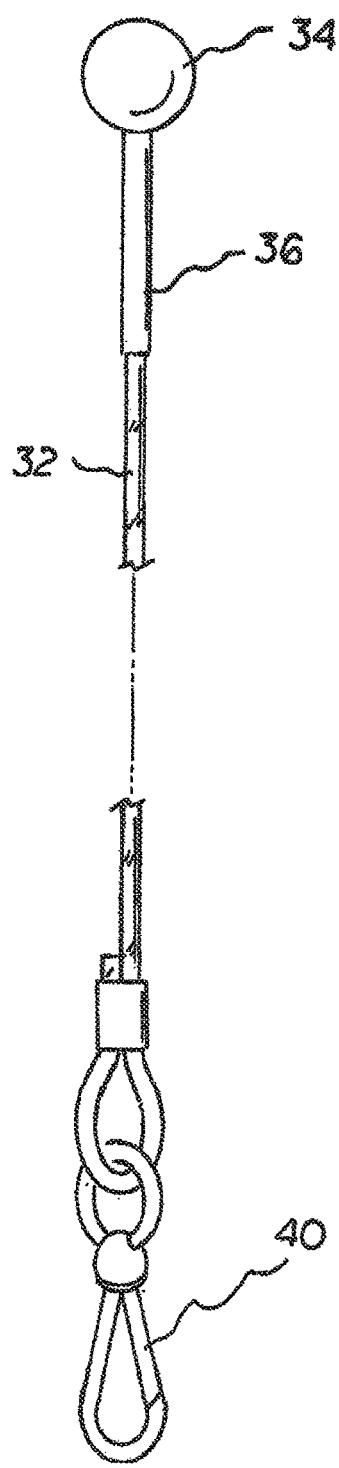
FIG. 5 is a view showing a lead constructed in accordance with an embodiment of the invention.

With reference now to the drawings, and in particular to FIGS. 1-5 thereof, an embodiment of the new and improved multi-lead dog leash system embodying the principles and concepts of the present invention and generally designated by the reference numeral 10 will be described.

The present invention of the multi-lead dog leash system 10 is comprised of a plurality of components. Such components are individually configured and correlated with respect to each other to attain the desired objective.

In their broadest context, the present invention is a dog leash system. The system 10 first includes a constraining apparatus formed in a spherical configuration with an upper hemisphere and a lower hemisphere. A hook extends upwardly from a central extent of the upper hemisphere. A circular opening is formed in a central extent of the lower hemisphere.

Next provided is a plurality of lower leads. Each lower lead each has an upper end and a lower end. Each upper end is formed with an enlarged terminus in a spherical configuration. Each enlarged terminus has a thinner shaft extending downwardly from a associated enlarged terminus. Lastly, a lower clip is attached to the lower end of an associated lower lead.

From a specific viewpoint, the present invention is a multi-lead dog leash system 10 for walking a plurality of dogs 12 and for preventing a tangling of leads between the dogs and an operator 14. The walking and the abating are done in a safe, convenient, and economical manner. The system includes a housing 18 formed in a spherical configuration with an upper hemisphere 20 and a lower hemisphere 22. A separable coupling 24 removably joins the upper hemisphere and the lower hemisphere. An eyehook 26 extends upwardly from a central extent of the upper hemisphere. A circular opening 28 is formed in a central extent of the lower hemisphere. The circular opening has a first diameter.

Next provided are a plurality of lower leads 32, three in the primary embodiment. The lower leads each have an upper end and a lower end. Each upper end is formed with an enlarged terminus 34 in a spherical configuration. Each enlarged terminus has a second diameter between 70 percent and 90 percent of the first diameter. Each enlarged terminus has a thinner shaft 36 extending downwardly from an associated enlarged terminus through the circular opening. Each thinner shaft has a length of between 2 and 5 times the diameter of the enlarged terminus. Each lower lead has a length of from 2 feet to 3 feet.

Three lower clips 40 are next provided. Each lower clip is attached to the lower end of an associated lower lead.

Lastly provided is an upper leash 44 having an upper end and a lower end. A handle 46 if formed as a loop in the upper end with an upper clip 48 in the lower end. The upper clip is separably attached to the eyehook 26. The upper leash has a length of from 1.5 feet to 3 feet. The optimal length depends on the height of the operator.

Figure 6:
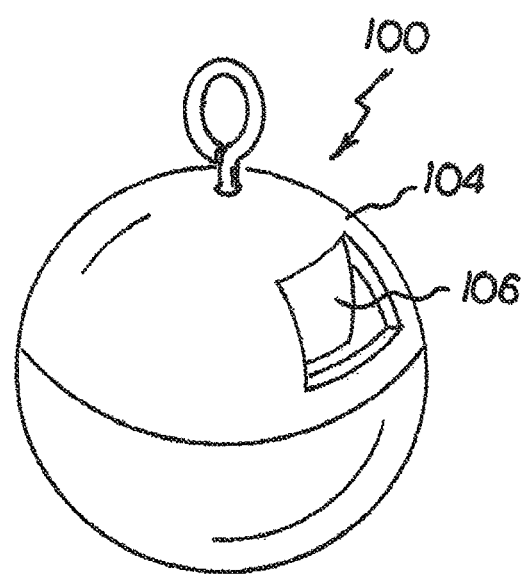
FIG. 6 is a perspective view of an alternative embodiment of the invention.
Figure 7:
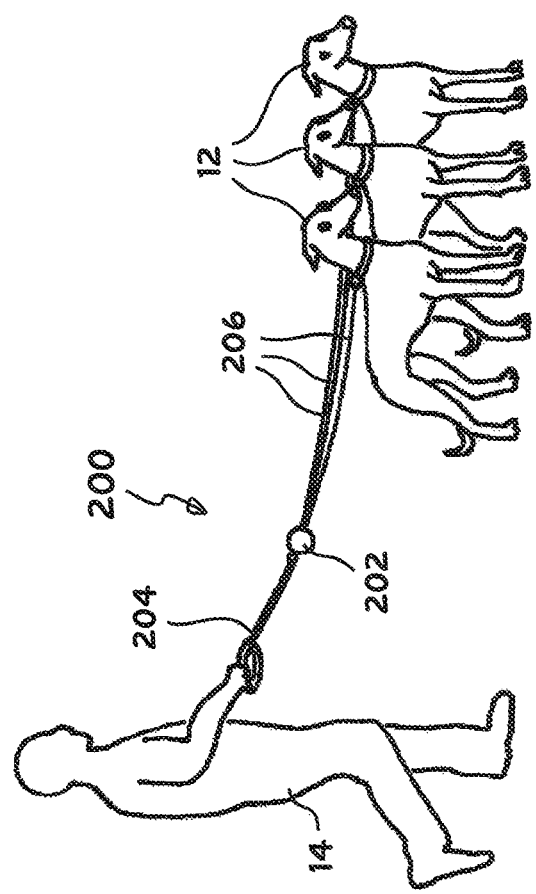
FIG. 7 is a perspective view of an alternative embodiment of the invention.
Figure 8:
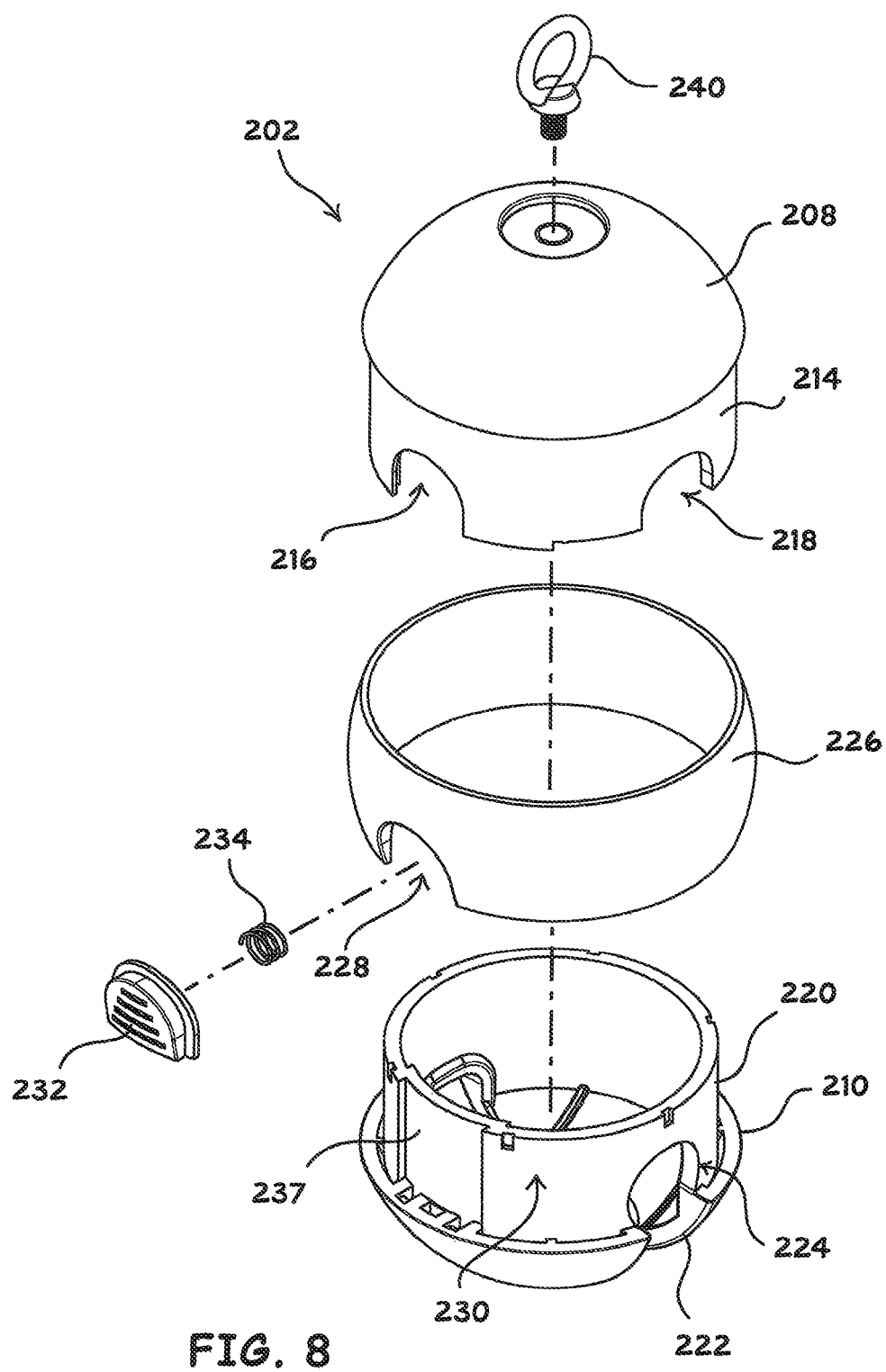
FIG. 8 is a perspective, exploded view according to the embodiment of FIG. 7.

In FIG. 6, an alternate embodiment of the invention, the system 100 includes an upper hemisphere 104. The upper hemisphere is formed with an aperture 106 for viewing within the constraining apparatus.

In FIGS. 7-13, there is shown another embodiment of a multi-lead leash system 200 in accordance with the invention. Like the previously described embodiments, leash system 200 is configured to allow a user 14 to walk more than one dog 12 while preventing tangling of leashes.

In the representatively illustrated embodiment, leash system 200 includes a housing 202, a user lead 204, and a plurality of animal leads 206. As depicted, the user lead 204 and the animal leads 206 are connected to the housing 202 such that the user 14 can grasp ahold of the user lead 204 and walk the dogs 12, each secured by a separate animal lead 206. While three animal leads 206 are shown, the system 200 can be operated with more or less than the shown three leads.

As described in further detail herein, the coupling between each animal lead 206 the housing 202 provides a tangle-free configuration that prevents the animal leads 206 from becoming tangled while the dogs are secured to a respective animal lead.

As depicted, the housing 202 has a first housing half 208 connected to a second housing half 210 and defines an interior space 212 within the housing 202. Representatively shown, the housing 202 is spherically shaped, but should not be limited to being spherically shaped because the housing could be shaped differently while remaining within the scope of invention.

First housing half 208 has a sidewall 214 that has formed therethrough an aperture 216 and an aperture 218 that is circumferentially offset from aperture 216. As representatively shown, and preferably, the apertures 216 and 218 are semi-circular shaped. However, the apertures 216 and 218 could have different shapes and should not be limited to the shown semi-circular shape.

The second housing half 210 has a sidewall 220 that has formed therethrough an elongated slot 222. One end of the slot 222 terminates at an aperture 224 that is also formed through the sidewall 220. The housing halves 208 and 210 are connected such that the aperture 216 is aligned with the third aperture 224 so an object can be passed through the apertures and disposed within the interior 212 of the housing, as will be described in further detail herein.

Figure 9:
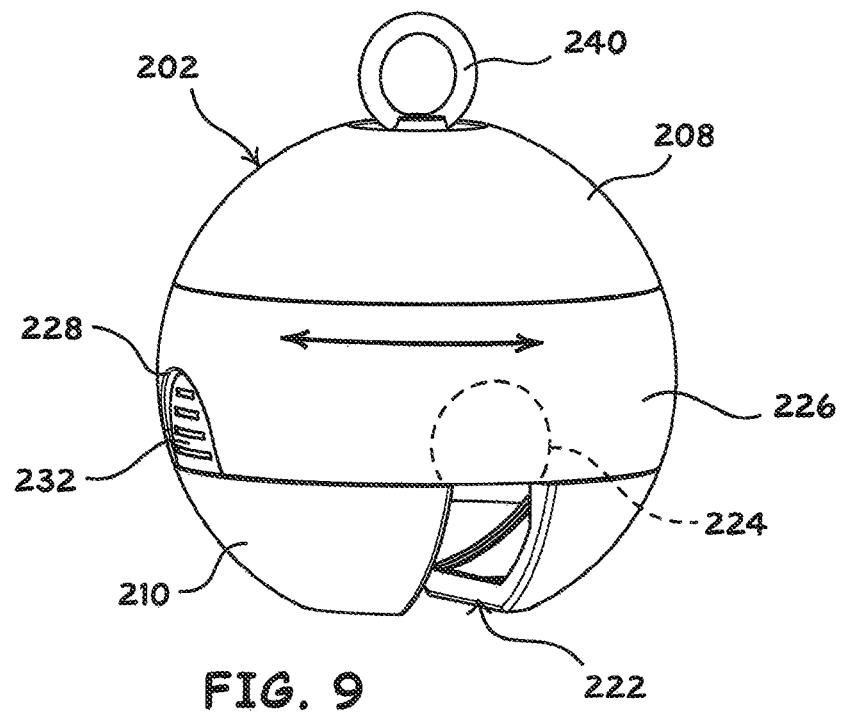
FIG. 9 is a perspective view of a housing according to the embodiment of FIG. 7, showing a shutter in a closed position.
Figure 10:
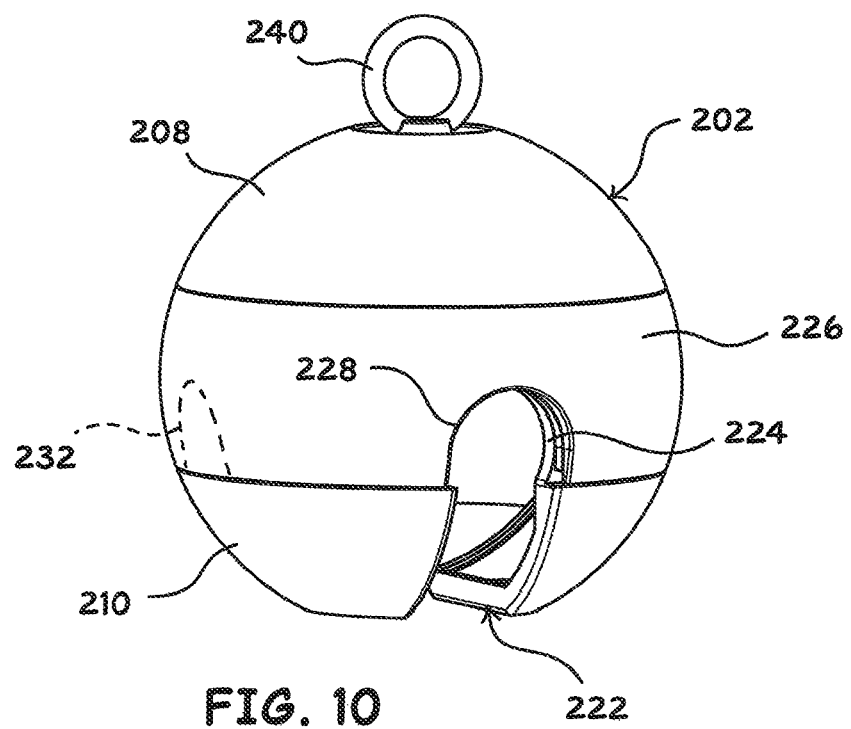
FIG. 10 is a perspective view of a housing according to the embodiment of FIG. 7, showing a shutter in an open position.
Figure 11:
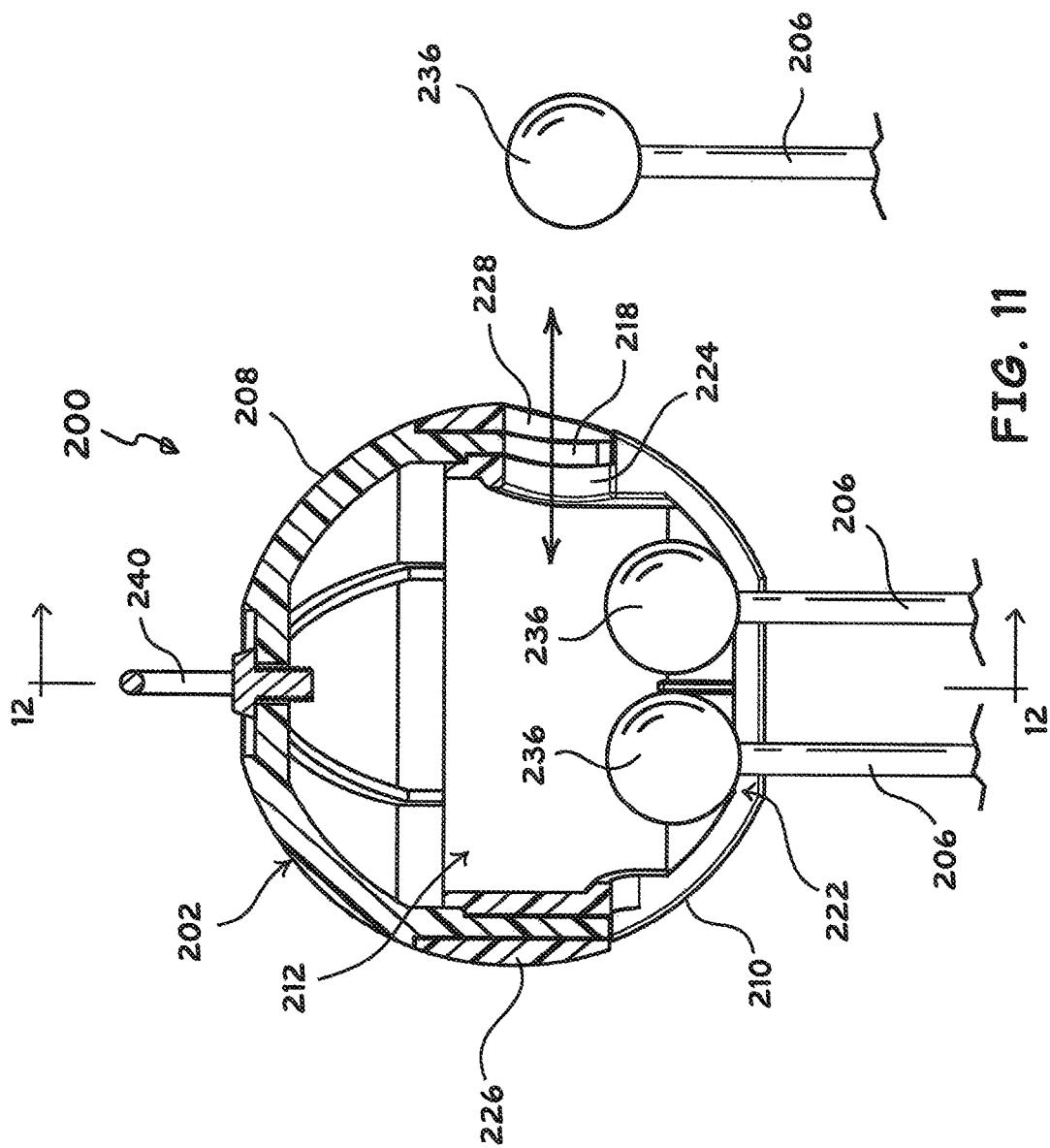
FIG. 11 is a first cross-sectional view of a housing according to the embodiment of FIG. 7.
Figure 13:
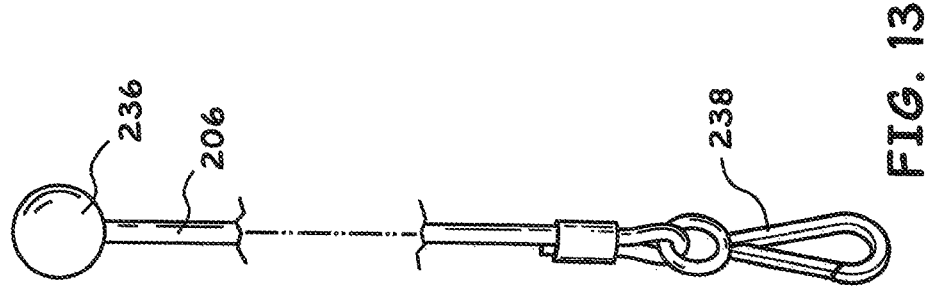
FIG. 13 is a plan view of an animal lead according to the embodiment of FIG. 7.
Figure 12:
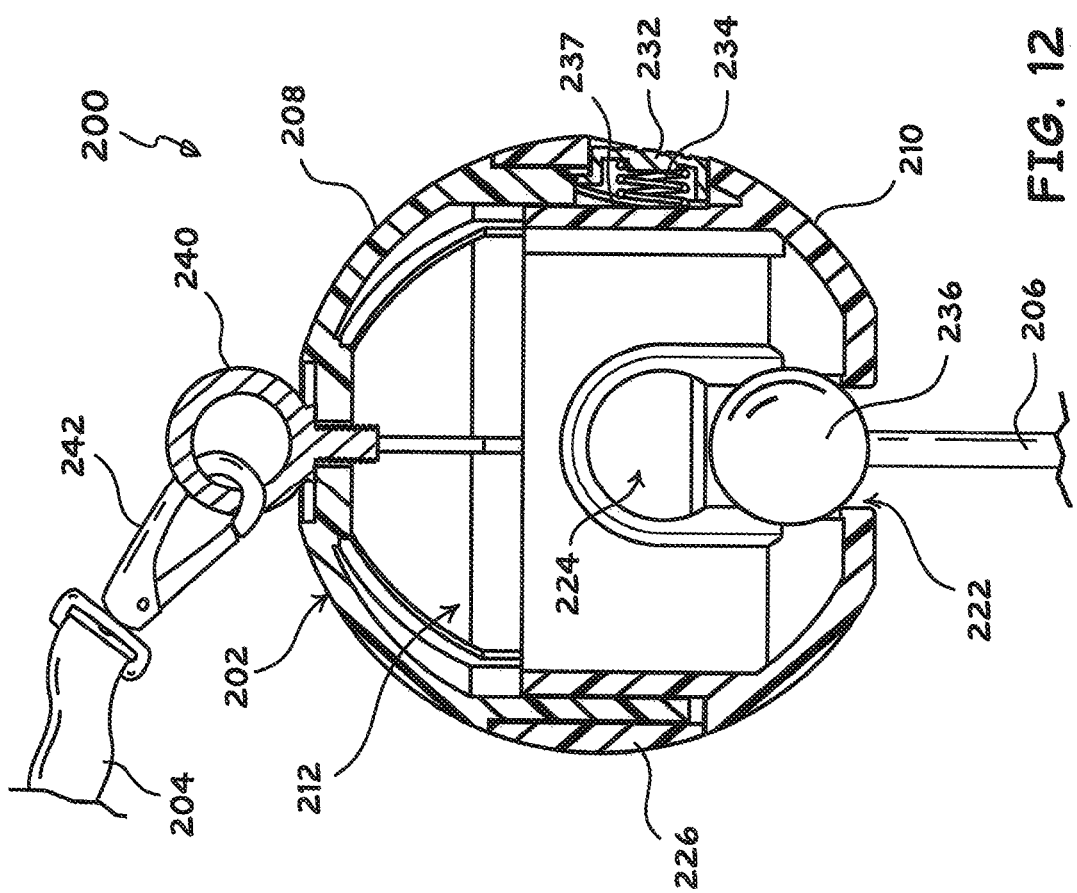
FIG. 12 is a second cross sectional view a housing according to the embodiment of FIG. 7.

A ring 226 has an aperture 228 that is formed through the sidewall thereof of the ring. The aperture 228 is open at one end of the ring, as shown. The ring 226 is movably attached to the housing 202 so that the ring can move relative to apertures 218 and 224 between a first position and second positions. In the first position, the aperture 228 of the ring is aligned with apertures 218 and 224 and the open end of aperture 228 is aligned with the slot 222. In the second position the aperture 228 is not aligned with apertures 218 and 224. In this manner, ring 226 is a shutter that operates to open and close apertures 218 and 224 to allow access and prevent as to the interior space 212. As depicted, the ring 226 is disposed in a circumferential recess 230 formed on an exterior of the housing 202 such that the ring can rotate about the housing between the first and second positions. In FIG. 9, the ring 226 is shown in the second position wherein apertures 218 and 224 are shutter closed by the ring. In FIG. 10, the ring 226 is shown in the first position wherein the ring aperture 228 is aligned with housing apertures 218 and 224, thereby opening the apertures to allow passing an object into and out of the interior space 212 of the housing.

A latch can be provided to lock the ring in the second position. As representatively shown, the latch comprises a push button 232 that is attached to the housing such that when the ring 226 is in the closed position the push button extends into or engages ring aperture 228 and restrains the ring from rotating about the housing 202. A spring 234 can be provided to bias the button 232 into or engagement with the ring aperture 228 when the ring is rotated into the closed position. As depicted, the button 232 and spring 234 are held captive in a recess 237 of the side wall 220 of housing halve 210 with the button extending through aperture 216 of housing halve 208.

Like leads 32 discussed above, each animal lead 206 has opposite ends with one end having attached thereto or having a terminus 236 and the opposite end having an attached clip 238. Clip 238 is attachable to an animal collar. As representatively shown, terminus 236 is spherically shaped and has a terminus diameter that is less than the width of or diameters of housing apertures 218 and 224 and ring aperture 228 such that the terminus can be passed through these apertures to be disposed in the interior 212 of the housing 202. The terminus diameter is great than the width of the housing slot 222 such that the terminus cannot pass through the slot.

To this end, each animal lead 206 is movably connected to the housing 202 by inserting the terminus 236 through aligned apertures 218, 224, and 228 and with a length of the lead extending through the slot 222. Shuttering apertures 218 and 224 retains the terminus 236 within the housing interior 212. This animal lead-to-housing coupling allows each terminus 236 to move freely relative to housing 202 within its interior 212, which prevents the leads 206 from becoming tangled.

A leash coupling 240, such as, for example an eyebolt is attached to the housing 202 at a side opposite of the slot 222. Coupling 240 allows attachment of user lead 204 to the housing 202 by a clip 242, for example.

While the invention herein disclosed has been described by means of specific embodiments and applications thereof, numerous modifications and variations could be made thereto by those skilled in the art without departing from the scope of the invention set forth in the following claims.

What is claimed is:

1. A multi-lead leash system, comprising:
    a housing having an interior space and an elongated slot having opposed first and second ends and a length therebetween, the slot formed through a periphery of the housing with the length extending across the periphery of the housing and in communication with the interior space and terminating at the second end at an aperture extending through the housing and in communication with the interior space, the slot having a transverse width and the aperture having an aperture opening width, the aperture opening width being greater than the transverse width of the slot;
    a shutter movably attached to the housing and movable relative to the housing between first and second positions, wherein when the shutter is in the first position, the aperture is closed and when the shutter is in the second position the aperture is open;
    at least two animal leads each having opposite ends one of which having a terminus, the terminus having a terminus width that is less than the aperture opening width and greater than the transverse width of the slot such that the terminus may pass through the aperture when the shutter is in the second position and cannot pass through the slot;
    wherein the terminus of each animal lead is removably disposed within the interior space of the housing with a length of the respective animal lead extending through the slot and moveable along its length;
    wherein the interior space has a volume greater than the combined volume of each terminus such that each terminus is freely movable within the interior space of the housing, thereby preventing entanglement of the animal leads extending through the slot; and
    a user lead coupling attached to the housing at a side opposite of the slot.

2. The multi-lead leash system of claim 1, wherein the housing is spherically shaped.

3. The multi-lead leash system of claim 1, wherein the terminus of each animal lead is spherically shaped.

4. The multi-lead leash system of claim 1, further comprising a user lead removably connected to the user lead coupling.

5. The multi-lead leash system of claim 1, further comprising a latch that is operable to secure the shutter in the first position.

6. The multi-lead leash system of claim 1, wherein the shutter is a ring that is attached to the housing such that the ring is rotatable about the housing between the first and second positions, and wherein the ring has a ring aperture that is aligned with the first aperture when the ring is in the second position, the ring aperture having a ring aperture width that is at least as great at the aperture width.

7. The multi-lead leash system of claim 6, further comprising:
    a latch that engages the ring aperture when the ring is in the first position so as to secure the ring in the first position, the latch being operable to disengage the ring aperture to allow the ring to rotate into the second position.

8. A multi-lead leash system, comprising:
    a housing having a spherical shape and defining an interior space, an elongated slot having opposed first and second ends and a length therebetween, the slot formed through a periphery of the housing along one side thereof with the length extending across the periphery of the housing and in communication with the interior space, the slot terminating at the second end at an aperture extending through the housing and in communication with the interior space, the slot having a transverse width and the aperture having an aperture opening width, the aperture opening width being greater than the transverse width of the slot;

a ring-shaped shutter having a ring aperture that is open at an end of the ring-shaped shutter, the ring-shaped shutter connected to the housing and rotatable with respect thereto between a first position and a second position, wherein when in the first position the ring aperture is not aligned with the aperture and when in the second position the ring aperture is aligned with the aperture, the ring aperture having a ring aperture width that is at least as great as the aperture opening width;

at least two animal leads, each having opposite ends one of which having a terminus, the terminus having a terminus width that is less than the aperture opening width and greater than the transverse width of the slot such that the terminus may pass through the aperture when the ring is in the second position and cannot pass through the slot;

wherein the terminus of each animal lead is removably disposed within the interior space of the housing with a length of the respective animal lead extending through the slot and moveable along its length;

wherein the interior space has a volume greater than the combined volume of each terminus such that each terminus is freely movable within the interior space of the housing, thereby preventing entanglement of the animal leads extending through the slot; and a user lead coupling attached to the housing at a side opposite of the slot.

9. The multi-lead leash system of claim 8, further comprising:
a latch that engages the ring aperture when the ring is in the first position so as to secure the ring in the first position, the latch being operable to disengage the ring aperture to allow the ring to rotate into the second position.

10. The multi-lead leash system of claim 9, wherein the latch is a push button that is spring biased.

11. The multi-lead leash system of claim 10, wherein the push button is captively held in a latch recess formed in the housing.

12. The multi-lead leash system of claim 9, wherein the ring-shaped shutter is disposed within a recess formed circumferentially around the housing.

13. The multi-lead leash system of claim 8, wherein each terminus is spherical shaped.

14. The multi-lead leash system of claim 8, wherein:
the housing has a first housing half and a second housing half that are connected to one another to form the housing;
the first housing half having a first sidewall, the first sidewall having a second aperture extending therethrough and a third aperture extending therethrough that is circumferentially spaced from the second aperture, the second aperture having a second aperture width that is at least as great as the first aperture width; and
the second housing half having a second sidewall, the second sidewall having the first aperture formed therethrough, the first aperture and the second aperture being aligned.

15. The multi-lead leash system of claim 14, further comprising:
a button latch that is disposed in a latch recess formed in the second sidewall and extending through the third aperture;
a spring disposed between the button latch the second sidewall and acting against the button latch to bias the button latch in a direction away from the second sidewall; and
wherein the button latch engaging the ring aperture when the ring is in the first position so as to releasably secure the ring in the first position.

* * * * *